United States Patent
Chandos et al.

(10) Patent No.: US 6,240,074 B1
(45) Date of Patent: May 29, 2001

(54) SECURE COMMUNICATION HUB AND METHOD OF SECURE DATA COMMUNICATION

(75) Inventors: Ronald V. Chandos, Tempe; William R. Worger, Gilbert; David M. Harrison, Mesa, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/025,808

(22) Filed: Feb. 19, 1998

(51) Int. Cl.[7] .............................. H04B 7/204; H04J 3/08; H04J 3/04; H04Q 7/20
(52) U.S. Cl. .................. 370/321; 370/319; 370/326; 370/535; 455/428; 455/432
(58) Field of Search .................... 370/321, 316, 370/319, 326, 524, 535, 536; 455/428, 432, 429, 430, 454, 427

(56) References Cited

U.S. PATENT DOCUMENTS

| | | | |
|---|---|---|---|
| 5,197,125 | * | 3/1993 | Engel et al. ................ 395/200 |
| 5,724,414 | * | 3/1998 | Dimolotsas et al. ......... 379/100.17 |
| 5,815,809 | * | 9/1998 | Ward et al. ................ 455/428 |
| 5,912,883 | * | 6/1999 | Hershberg .................. 370/319 |
| 5,914,942 | * | 6/1999 | Hassan et al. .............. 370/316 |
| 5,926,758 | * | 7/1999 | Grybos et al. .............. 455/429 |
| 6,005,874 | * | 12/1999 | Sharpe ..................... 370/524 |
| 6,081,709 | * | 6/2000 | Karabinis .................. 455/427 |

OTHER PUBLICATIONS

An article entitled "Program Overview", Milstar Program Overview from Millstar Program homepage (no date).
An Article entitled "EHF–Extremely High Frequency" from EHF homepage (no date).

* cited by examiner

Primary Examiner—Huy D. Vu
Assistant Examiner—M. Phan
(74) Attorney, Agent, or Firm—Frank J. Bogacz; Maurice J. Jones

(57) ABSTRACT

A secure communication hub (10) relays local communications between low probability of intercept (LPI) user radio equipment (68) and provides a secure interface with a command center (58) through a non-geostationary commercial satellite communication system. The secure communication hub (10) includes different radio interface units (12) for communicating different data formats with the (LPI) user radio equipment (68). Encryption and decryption circuitry (18) provides for different security levels and different keys for the (LPI) user radio equipment. Links with the satellite system are secured using encryption.

16 Claims, 3 Drawing Sheets

300

400

SECURE COMMUNICATION HUB AND METHOD OF SECURE DATA COMMUNICATION

FIELD OF THE INVENTION

This invention pertains to secure communication systems in general and in particular to secure methods of transferring information, and more particularly to secure communication systems for the military that use commercial non-geostationary satellite communication systems.

BACKGROUND OF THE INVENTION

Special forces in the military need to transmit and receive messages without being detected and without their messages being intercepted. Many of these messages are required to be sent to safe havens outside their area of operation. Other messages need to be communicated locally. A typical local environment would include a situation where numerous personnel are carrying handheld radios, where radios are located on vehicles such as jeeps and tanks, and where radio's are stationed at local command posts.

Presently, high frequency long haul communication systems are used for covert operations. These systems transmit over long distances by bouncing the RF waveform off the atmosphere. However there are many problems with such high frequency long haul communication systems. The ability to establish and maintain a communications channel between specific locations is difficult. Furthermore, the link characteristics for high frequency communications are very dependent upon the time of day and other atmospheric conditions such as sun spots, for example. These conditions may prevent covert communications from being possible at times when they are often needed. Another problem with existing systems is that deployment of a viable antenna requires a huge area, which is undesirable during covert operations. Furthermore, an omni-directional antenna is typically used which increases the chances of detection. Another problem with high frequency long haul communication systems is that the data bandwidth is typically very small and insufficient for many communication scenarios.

Military geostationary satellites are also used for secure communications. However, these systems require transmission to geostationary satellites requiring substantial transmission power and large antennas. These systems have the disadvantage of requiring a large infrastructure of satellites and associated control facilities dedicated to covert and secure communications. Another disadvantage to these systems is that the satellites, such as the MILSTAR satellites, are typically very large and expensive to deploy.

Another problem with present systems is that they do not provide for flexible local communications among various users at a covert site. The local users, which may communicate with different data formats make communication difficult.

Accordingly, what is needed is a secure communication system and method for communicating data securely without having to deploy a large infrastructure. What is also needed is a method and apparatus that can establish and maintain a communications channel with a specific far away location. Furthermore, what is needed is a system where the link characteristics are not significantly affected by the time of day or other atmospheric conditions. What is also needed is a system in which deployment of a viable antenna does not requires a huge area, and a system that does not require and omni-directional antenna for communication with satellites. What is also needed is a system and method with sufficient data bandwidth for many communication scenarios. What is also needed is an apparatus an method that helps facilitate local communications at a covert site.

Furthermore, what is also needed is an apparatus and method that provides a collection point for low probability of intercept (LPI) and low probability of detection (LPD) radios by the special forces. What is also needed is a method and apparatus that can communicate securely with a military command post at a far distant location.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a secure communication radio hub for communicating securely over large distances. In the preferred embodiments, the secure communication hub of the present invention serves as a collection point for low probability of intercept (LPI) and low probability of detection (LPD) radios providing secure communication with a far away location such as a command center. The secure communication hub of the present invention also provides for communications among the LPD or LPI local user radio equipment.

Figure 1:
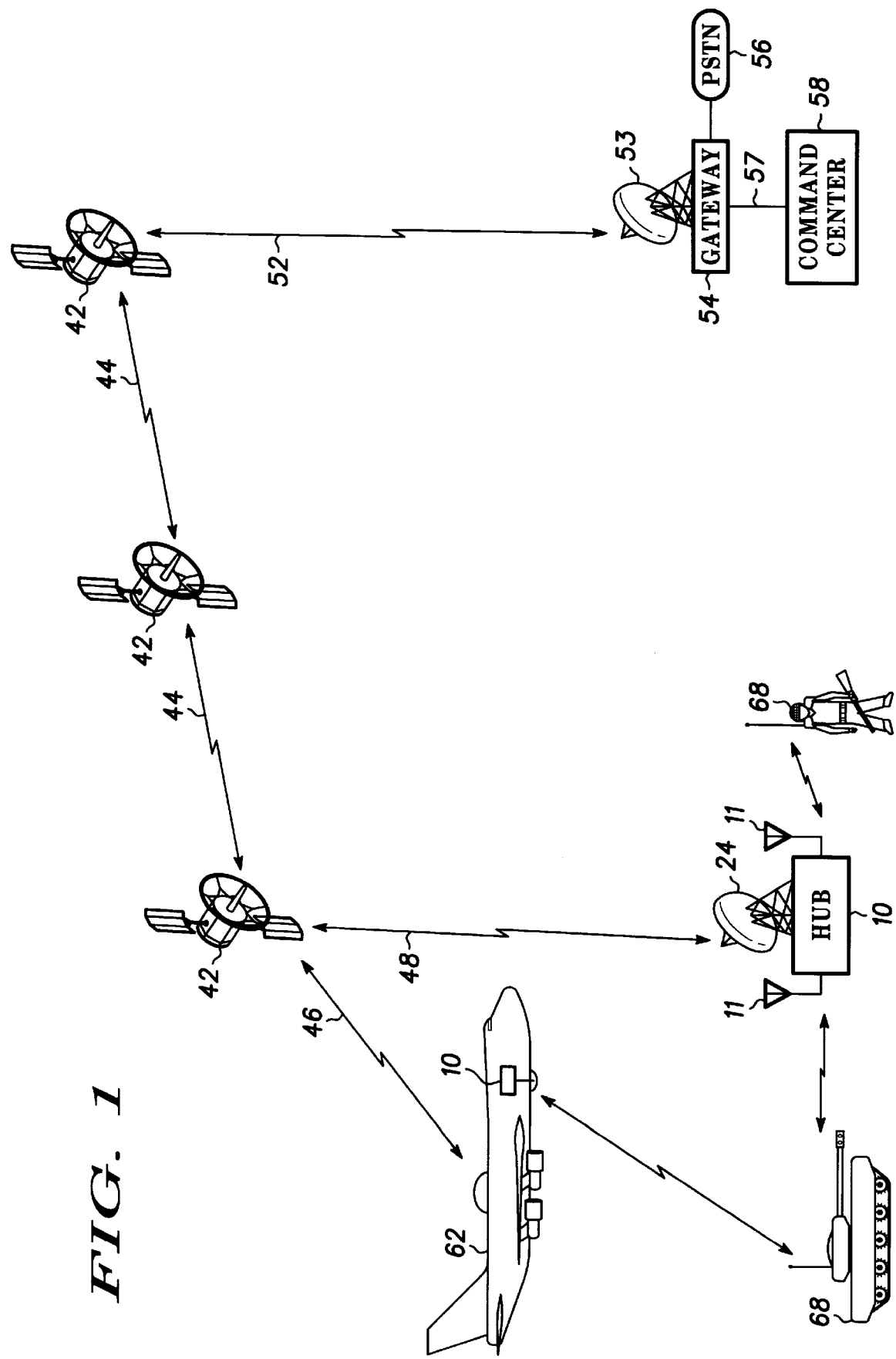
FIG. 1 illustrates an environment in which the secure communication hub of the present invention may be practiced.

FIG. 1 illustrates an environment in which the secure communication hub of the present invention may be practiced. The environment of FIG. 1 includes a commercial satellite communication system that includes commercial communication satellites 42 that may be used for communicating with commercial subscriber units (not shown) on the ground, for example. In the preferred embodiment, the commercial communication system uses non-geostationary satellites such as low earth orbit satellites. In this embodiment, satellites 42 preferably communicate with each other through cross-links 44 and route communications through ground based gateways through satellites 42 to ground links 52. In the preferred embodiment, cross-links 44 are in the k-band frequency range although other frequency ranges including optical cross-links are suitable. Satellite to ground link 52 is preferably in the k-band frequency range although other frequency ranges are also suitable. Commercial communications are routed from subscriber units through the network of communications satellites 42 through a gateway 54 and to the public switched telephone network (PSTN) 56. In one embodiment of the present invention, the PSTN serves as the communication link to command center 58. Examples of suitable commercial satellite communication systems are described in U.S. Pat. No. 5,410,728 to Bertiger et al. and U.S. Pat. No. 5,367,304 to Jan et al., which have a common with the present application and are hereby incorporated by reference.

In accordance with the preferred embodiments of the present invention, encrypted military communications are routed to and from command center 58 through link 57 (or PSTN 56) and through the commercial satellite communication system to secure communication hub 10. Secure communication hub 10 may be located, for example, at a remote ground location or in aircraft 62. When the data is transmitted between the command center and secure communication hub 10, the data is preferably in a secure form. As described below, the hubs and the command center have the means for encrypting and decrypting the information. Additionally, secure communication hub 10 of the present invention provides for local communication among local users, as well as secure communication to a distant point such as command center 58. A typical environment where the secure communication hub of the present invention operates includes environments with numerous personnel carrying hand-held radios, vehicles such as jeeps and tanks, etc. Secure communication hub 10 allows such numerous local user radio equipment 68 to communicate securely amongst each other and also provides for the interoperability of equipment communicating in different communication formats.

Because it is desirable for such local user radio equipment 68 to transmit and receive messages without detection and without such messages from being intercepted, hub 10 serves as a collection point. Thus, local user radio equipment 68 do not have to transmit directly to a military geostationary satellite or other satellite system. In the preferred embodiment, secure communication hub 10 is located in the line of sight of local user radio equipment 68 and other such radio equipment participating in local communications. Secure communication hub 10 may be located on a nearby hill or an aircraft such as an AWACS platform overlooking the operation.

In the preferred embodiment, hub 10 includes antennas 11 for communicating directly with local user radio equipment 68. Hub 10 also includes directional antenna 24 for providing a directional k-band communication signal and link 48 to satellites 42. Through the use of direct satellite directional antenna 24, the probability of detecting the location of hub 10 is greatly reduced since antenna 24 directs its transmission towards the sky. In the preferred embodiment where hub 10 communicates with a low earth orbit satellite communication system, satellite antenna 24 may track the position of satellites 42 as they pass overhead to insure uninterrupted communications. In a preferred embodiment of the present invention, hub 10 includes two satellite antennas 24 to maintain a continuous communication link with the satellites of the communication system when the satellites drop out of sight. In another embodiment, antenna 24 is comprised of a phased array antenna capable of tracking satellites 42, and preferable, capable of receiving from and transmitting to two of satellites 42 during handover between satellites.

K-band transmissions from satellites 42 over links 46 and 48 may be transmitted over a very large geographic area because it is very difficult to determine the desired destination which adds to the covertness of the mission. Furthermore, the data is preferably transmitted in a highly secured form where interception is not a major concern. The use of a commercial satellite communication system that provides worldwide coverage allows the present invention the ability to be operated virtually anywhere worldwide without a substantial investment in a worldwide communication system. Since the security (e.g. encryption) is preferably on a packet-by-packet basis from the end user to another end user, the data is transparent to the commercial satellite communication system.

Figure 2:
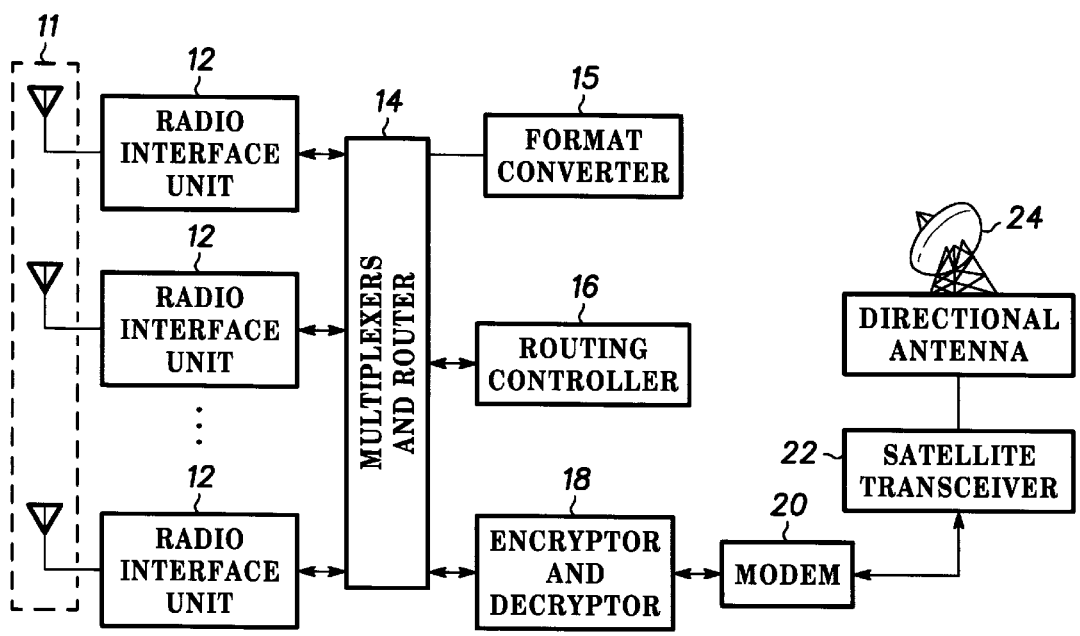
FIG. 2 illustrates a block diagram of a secure communication hub in accordance with a preferred embodiment of the present invention.

FIG. 2 illustrates a block diagram of secure communication hub 10 in accordance with a preferred embodiment of the present invention. Radio interface units 12 collect radio communications from local user radio equipment 68 through use of antennas 11. Antennas 11 may be directional or omni-directional antennas and may be custom tailored for specific local user radio equipment 68. In the preferred embodiment, the information communicated through the radio interface units 12 is packetized data. Multiplexers and routers 14 and routing controller 16 determines the routing for the data received from the local user radio equipment 68. In some instances, the data received from local user radio equipment 68 are routed to command center 58. In other cases, data received from local user radio equipment 68 are routed to other local user radio equipment. When communications are routed back to command center 58 as determined by routing controller 16, format converter 15 may perform format conversion on data packets and routers 14 routes the data packets to encryptor 18 for subsequent transmission through the commercial satellite communication system through modem 20, satellite transceiver 22, and directional antenna 24. The data packets are decrypted at command center 58 (FIG. 1).

In the preferred embodiment of the present invention, local communications between local user radio equipment 68 and hub 10 are carried out in a secure mode through the use of low probability of detection and low probability of intercept secure radio equipment. In one embodiment, local radio equipment 68 uses encryption to protect information being transmitted. In this one embodiment, communications between local users and communications between local users and hub 10, decryptor portion of encryptor 18 is included in hub 10.

When communications received from local user radio equipment 68 are to be routed to other local user radio equipment 68 through antenna 11 and radio interface units 12, routing controller 16 determines this, for example, through header information on the data packet. Format converter may perform format conversion and router 14 routes the data packets to the appropriate radio interface unit 12 for transmission to the local user radio equipment 68. The format and protocol conversions may be performed by format converter 15 to allow for communications between any source and destination local user radio equipment 68. Format converter 15 among other things may provide for different modulation formats, various encryption formats and various LPD and LPI formats. In the preferred embodiment of the present invention, when data is transmitted to the commercial satellite communication system for receipt by command center 58, typical packet encryption techniques are preferably used.

In another preferred embodiment of the present invention, local user radio equipment may use different encryption keys. In this embodiment, decryptor and encryptor 18 allows communications between such local user radio equipment and has access to such keys, and may provide user authentication and data verification.

Command center 58 is preferably located in a secure and well-protected area, such as a military command center or perhaps the U.S. Pentagon Building. Command center 58 may have connectivity into other military communication networks allowing for intelligence information to be distributed among the military organization as required. In the preferred embodiment, command center 58 preferably includes packet encryption and decryption equipment and other interface communication equipment for military communication channels. Command center 58, preferably includes equipment to maintain a full duplex secure interface with hub 10 through communication gateway 54. In the preferred embodiment, command center 58 may include its own satellite antenna 53 and the up-and-down converting equipment and modems typically included in a satellite gateway. In this embodiment, command center 58 appears like a typical gateway in the satellite communication system where the PSTN connectivity is replaced by the military communications infrastructure.

When command center 58 receives data packets, the data packets are decrypted to determine the protocol format of the packet and the packets are routed to their intended destination in a format suitable for the end user. The end user may be a communication resource such as the defense switch network (DSN) or defense red switch network (DRSN) for voice, or over the non-secure internet protocol router network (NIPRNET), the secret internet protocol router network (SIPRNET), the joint worldwide intelligence communication system (JWICS) or video teleconferencing for data (VTC). The end user may perform decryption of the information, or the decryption of the information may be performed at the gateway for all data packets.

In the preferred embodiment, secure communication hub 10 includes a plurality of radio interface units 12. Each radio interface unit 12 communicates via radio communication links with select ones of the local user radio equipment 68. Secure communication hub 10 also includes a satellite transceiver 22 for communicating with satellites of the satellite communication system. Secure communication hub 10 also includes router and multiplexers 14 and routing controller 16 for controlling the routing of the communications among the plurality of radio interface units 12 and for routing communications between the satellite transceiver 22 and the radio interface units 12.

In one preferred embodiment, secure communication hub 10 includes directional antenna 24 discussed above coupled with satellite transceiver 22 for communicating with a non-geostationary satellite of the satellite communication system. Satellite transceiver 22 includes means for receiving and transmitting signals at RF frequencies, desirably at K-band, with satellites. In one preferred embodiment of the present invention, secure communication hub 10 includes a radio interface unit 12 for communicating with each type of various local user radio equipment 68. In this embodiment, different types of radio interface units receive and transmit information in different data formats. In this embodiment, format converter 15 converts the data to formats suitable for the appropriate local user radio equipment 68.

Figure 3:
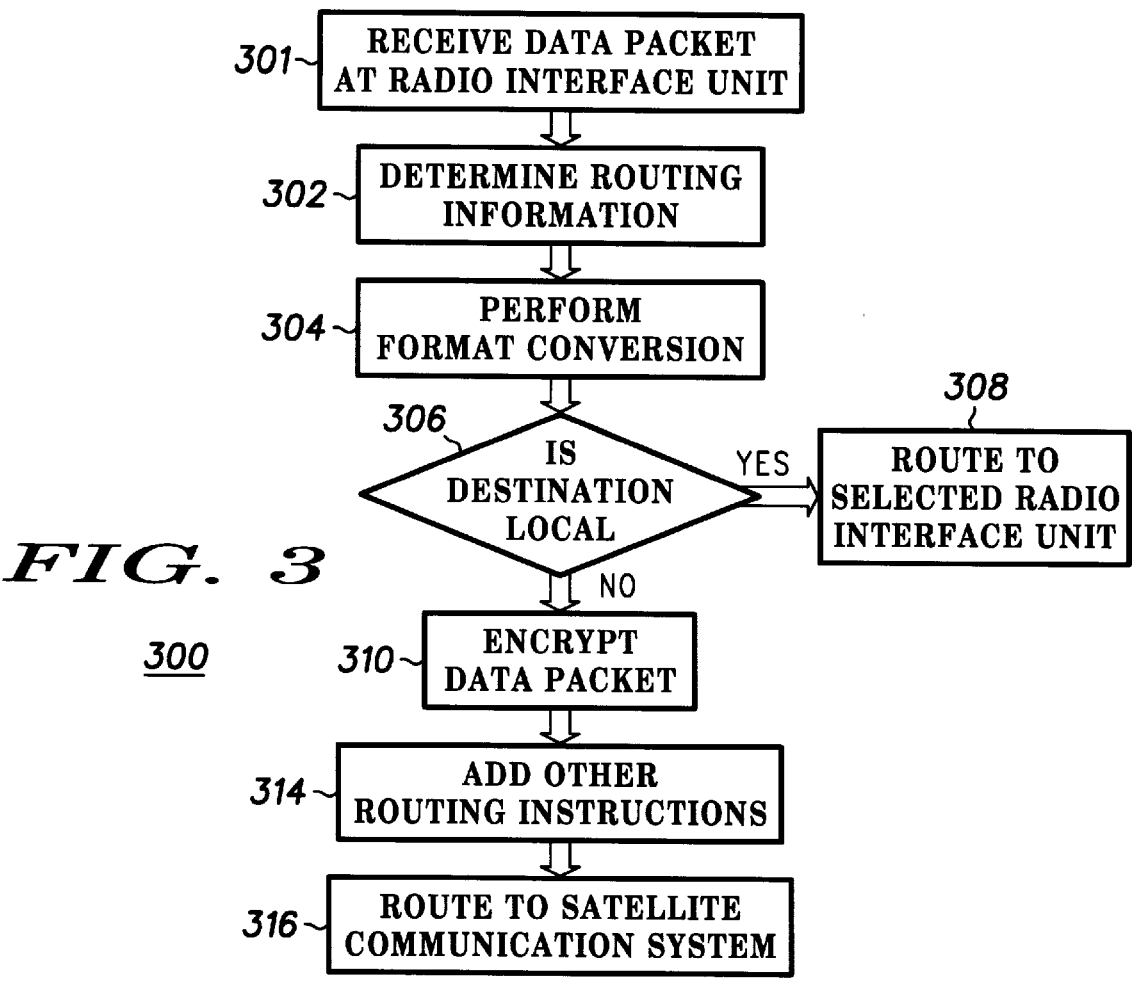
FIG. 3 illustrates a first packet routing procedure suitable for use in accordance with a preferred embodiment of the present invention.

FIG. 3 illustrates a first packet routing procedure suitable for use in accordance with a preferred embodiment of the present invention. Procedure 300 is suitable for routing data packets and other information in RF form received by secure communication hub 10 through radio interface units 12. Although procedure 300 is described for data in packetized format, the present invention is suitable for data in non-packetized form. In task 301, a data packet of information is received by one of the radio interface units 12. In task 302, routing information is determined from the data packet. In the preferred embodiment, this information is included in a packet header and may be in an encrypted form or have added security such as a digital signature. When the routing information is in a secure form or includes added security, task 302 includes the task, for example, of decrypting the routing information or verifying a digital signature.

In task 304, a format conversion may be performed on the data packet. The particular format conversion selected by task 304, if any, is preferably determined by the routing information from task 302. For example, the format conversion may depend on the particular local user radio equipment 68 (FIG. 1) that will be receiving the data packet. Task 306 determines whether or not the destination for the data packet is a local destination, (i.e., one of the radio interface units 12 for transmission to a particular local user radio equipment 68), or if the destination for the data packet is a far destination such as command center 58 (FIG. 1). When the destination is a local destination, task 308 is performed. In task 308, the data packet is routed to the appropriate radio interface unit 12 as determined by task 302. When task 306 determines that the destination for the data packet is not local, task 310 is performed and the data packet preferably has security installed on it. In the preferred embodiment, the data packet is encrypted, however the type of encryption and security installed on the packet may depend on the packet's destination. Furthermore, routing information on the packet may be encrypted separately in accordance with the recipient's router. In task 314, appropriate routing instructions are added to the data packet and in task 316, the data packet is routed to a satellite communication system. The routing instructions added for the satellite communication system desirably compatible with routing instructions used for typical communication data, such as commercial data. In the preferred embodiment, task 316 involves the use of modem 20, satellite transceiver 22 and directional antenna 24 (FIG. 1). The satellite communication system treats the data packets from hub 10 like any other data packets received from commercial and non-secure end users. The security on the information is desirably "invisible" to the commercial communication system.

The type of security installed on data packets may include several forms and is not limited to encryption of the data. Such forms include means for verifying that information has not been tampered with, and means for authenticating the sender of the data, for example through the use of digital signatures and public and private key systems.

Figure 4:
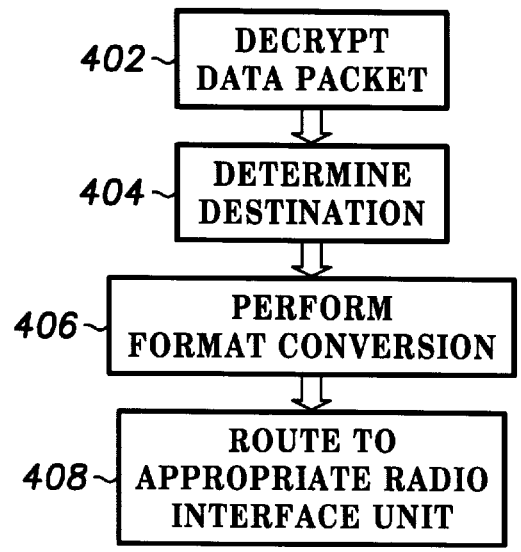
FIG. 4 illustrates a second packet routing procedure suitable for use in accordance with a preferred embodiment of the present invention.

FIG. 4 illustrates a second packet routing procedure suitable for use in a preferred embodiment of the present invention. Procedure 400 is performed for data packets received at secure communication hub 10 from a satellite communication system through directional antenna 24, satellite transceiver 22 and modem 20. In the preferred embodiment, all data received from the communication satellite system is either in a secure format or has some sort of security associated with the data. Accordingly, task 402 may perform a decryption of the data packet, verify a digital signature to authenticate the sender, or determine that the information has not been corrupted or changed.

In task 404, the data packet destination is determined preferably by reading information in the data packet such as a packet header or routing information. The type of data may also be used as an indicator for determining the destination. In one embodiment of the present invention, the header may first have to be decrypted to determine the appropriate decryption necessary to perform task 402. In this embodiment, task 404 and 402 may be performed concurrently. In task 406, appropriate format conversions are performed, if necessary, on the data packet prior to the routing of the data packet to the appropriate radio interface unit 12 in task 408. Task 406 is performed by format converter 15 (FIG. 2). In task 408, radio interface unit 12 transmits the information for receipt by select local user radio equipment 68 (FIG. 1).

In one embodiment of the present invention, decryption and encryption of data is performed by at least some of the local users. In this embodiment, the encryption and decryption portions of tasks 310 (FIG. 3) and 402 are performed by at least some local user radio equipment 68 (FIG. 1).

Thus, an apparatus and method has been described that provides a collection point for low probability of intercept (LPI) and low probability of detection (LPD) radios by the special forces. The method and apparatus that provide for secure communication with a military command post at a far distant location allowing for special forces in the military need to transmit and receive messages without being detected and without their messages being intercepted. The method and apparatus also provide for communications between the various local user radio equipment.

The apparatus and method described is suitable for covert operations and does not require bouncing the RF waveform off the atmosphere. Accordingly, the ability to establish and maintain a communications channel between specific locations is easier, and the link characteristics are not necessarily so dependent upon the time of day and other atmospheric conditions. An advantage to the present invention is that in the preferred embodiment that uses non-geostationary satellites, a small directional antenna is used which is undesirable during covert operations and decreases the chances of detection. Another advantage to the present invention is that the data bandwidth is greater than typical high frequency long haul communication systems.

What is claimed is:

1. A secure communication hub for routing communications among local user radio equipment, and securely routing communications with a remote command center using a satellite communication system, the secure communication hub comprising:

a plurality of radio interface units, each for communicating with select ones of the local user radio equipment, wherein at least some of the radio interface units communicate with the local radio equipment using a low-probability of detection format;

a router coupled with each radio interface unit;

a format converter coupled to the router;

a satellite transceiver for communicating with satellites of the satellite communication system;

data encryption/decryption circuitry coupled between the satellite transceiver and the router for providing encrypted data packets to the satellite transceiver and providing decrypted data packets to the router;

a routing controller coupled to the router for controlling routing of communications among the plurality of radio interface units, and routing communications between the satellite transceiver and the radio interface units, wherein when data destined for the remote command center is received from one of the local user radio equipment, the format converter performs a format conversion on said data to create packetized data suitable for said satellite communication system, the routing controller adds routing instructions to said data to identify said command center as a destination for said data, the data encryption/decryption circuitry encrypts said data on per-packet basis, and the satellite transceiver transmits said data in packetized form for routing through the satellite communication system to the command center.

2. A secure communication hub as claimed in claim 1 wherein the satellite communication system includes non-geostationary satellites in low-earth orbit, and wherein the secure communication hub includes a directional satellite antenna coupled with the satellite transceiver, the directional satellite antenna having means for tracking the non-geostationary satellites and communicating information from the satellite transceiver, and wherein said non-geostationary satellites communicate directly with adjacent non-geostationary satellites of said satellite communication system with cross-links, whereby said data destined for the remote command center is routed among said non-geostationary satellites over said cross-links, said data being in packetized form and being routed along with commercial voice and data packets destined for the public switched telephone system.

3. A secure communication hub as claimed in claim 2 wherein when data destined for one of the local user radio equipment is received from the command center, the data encryption/decryption circuitry decrypts said data on a per-packet basis, the format converter performs a format conversion on said data to said low-probability of detection format, and the routing controller determines which of the radio interface units to route said data to based on routing instructions received with said data.

4. A secure communication hub as claimed in claim 2 wherein the secure communication hub communicates with a plurality of types of said local user radio equipment communicating with different modulation formats, and wherein the secure communication hub includes a radio interface unit for each type of said local user radio equipment.

5. A secure communication hub as claimed in claim 2 wherein the plurality of radio interface units include means for communicating with different types of user radio equipment, and wherein the different types of radio interface units receive and transmit information in differing data forms with corresponding user radio equipment, some of the user radio equipment providing digital packetized data, some of the user radio equipment providing data in analog form, and wherein the different types of radio interface units include at least a first radio interface unit for the digital packetized data, and a second radio interface unit for the data in analog form.

6. A secure communication hub as claimed in claim 2 wherein the plurality of radio interface units communicate with different types of user radio equipment, and wherein the different types of radio interface units receive and transmit information in differing data forms with corresponding user radio equipment, wherein some of the user radio equipment provide digital packetized data in first and second data formats, the different types of radio interface units including first and second radio interface units for respectively, communicating the first and second data formats.

7. A secure communication hub as claimed in claim 2 further comprising a local antenna coupled with each of the radio interface units, the local antenna for communicating signals with the local user radio equipment.

8. A secure communication hub as claimed in claim 7 wherein the local antenna is an omni-directional antenna.

9. A secure communication hub as claimed in claim 7 wherein the local antenna is a phased array antenna that provides directional signals corresponding with directions of the user radio equipment.

10. A secure communication hub as claimed in claim 2 wherein the secure communication hub is located on a movable ground station.

11. A secure communication hub as claimed in claim 2 wherein the secure communication hub is located in an aircraft.

12. A secure communication hub as claimed in claim 1 wherein encrypted data is received from a communication satellite through the satellite transceiver, and wherein the data encryption/decryption circuitry decrypts the encrypted data in accordance with a type of user radio equipment the encrypted data is intended, and wherein the data encryption/decryption circuitry encrypts data received from the user radio equipment for transmission to the communication satellite, the encryption being in accordance the type of user radio equipment.

13. A secure communication hub as claimed in claim 2 wherein the radio interface units communicate with local user radio equipment, the user radio equipment being low probability of detection (LPD) user radio equipment providing data packets in an LPD modulation format.

14. A secure communication hub as claimed in claim 2 wherein at least one of the radio interface units include means for communicating spread spectrum signals with the user radio equipment.

15. A secure communication hub as claimed in claim 14 wherein at least one of the radio interface units include means for communicating code division multiple access (CDMA) signals with the local user radio equipment.

16. A secure communication hub as claimed in claim 2 wherein each of the radio interface units converts RF signals from the local user radio equipment to corresponding baseband signals, and wherein each of the radio interface units converts baseband signals to RF signals for transmission to the local user radio equipment.

* * * * *

UNITED STATES PATENT AND TRADEMARK OFFICE
CERTIFICATE OF CORRECTION

| | | |
|---|---|---|
| PATENT NO. | : 6,240,074 B1 | Page 1 of 1 |
| APPLICATION NO. | : 09/025808 | |
| DATED | : May 29, 2001 | |
| INVENTOR(S) | : Ronald V. Chandos et al. | |

It is certified that error appears in the above-identified patent and that said Letters Patent is hereby corrected as shown below:

In claim 1, column 8, line 3, delete "center." and add --center; the satellite communication system includes non-goestationary satellites in low-earth orbit; and wherein said non-geostationary satellites communicate directly with adjacent non-geostationary satellites of said satellite communication system with cross-links, whereby said data destined for the remote command center is routed among said non-geostationary satellites over said cross-links, said data being in packetized form and being routed along with commercial voice and data packets destined for the public switched telephone system.--.

In claim 2, column 8, line 5, delete "the satellite communication system includes non-geostationary satellites in low-earth orbit, and wherein".

In claim 2, column 8, line 11, delete "transceiver, and wherein said non-geostationary satellites communicate directly with adjacent non-geostationary satellites of said satellite communication system with cross-links, whereby said data destined for the remote command center is routed among said non-geostationary satellites over said cross-links, said data being in packetized form and being routed along with commercial voice and data packets destined for the public switched telephone system." and add --transceiver.--.

Signed and Sealed this

First Day of July, 2008

JON W. DUDAS
*Director of the United States Patent and Trademark Office*